United States Patent
Tomiyama

(10) Patent No.: US 6,463,268 B2
(45) Date of Patent: *Oct. 8, 2002

(54) ALC CIRCUIT RECEIVER WITH SENSITIVITY SWITCHING FOR CONTROLLING

(75) Inventor: Hitoshi Tomiyama, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,022

(22) Filed: Apr. 30, 1998

(65) Prior Publication Data

US 2001/0014595 A1 Aug. 16, 2001

(30) Foreign Application Priority Data

May 9, 1997 (JP) ............................................ 09-118984

(51) Int. Cl.⁷ ............................. H04B 7/15; H04B 1/10; H04B 15/00; H04B 7/00; H04B 1/16
(52) U.S. Cl. ........................ 455/302; 455/11.1; 455/63; 455/236.1; 455/447
(58) Field of Search .................................. 455/323, 302, 455/304, 306, 324, 285, 63, 236.1

(56) References Cited

U.S. PATENT DOCUMENTS

| | | | |
|---|---|---|---|
| 3,946,318 A | * | 3/1976 | Gruber .................... 455/236.1 |
| 4,940,950 A | * | 7/1990 | Helfrick |
| 5,003,619 A | * | 3/1991 | Morris et al. |
| 5,160,902 A | * | 11/1992 | Saeki et al. |
| 5,170,392 A | * | 12/1992 | Riordan |
| 5,901,349 A | * | 5/1999 | Guegnaud et al. .......... 455/302 |
| 5,974,301 A | * | 10/1999 | Palmer et al. ................. 455/63 |
| 6,088,570 A | * | 7/2000 | Komara et al. ............ 455/11.1 |
| 6,088,592 A | * | 7/2000 | Doner et al. ................. 455/447 |

\* cited by examiner

*Primary Examiner*—William Cumming
(74) *Attorney, Agent, or Firm*—Jay H. Maioli

(57) ABSTRACT

A radio receiver of the is provided with a local oscillation circuit, a mixing circuit to perform a frequency conversion from a received signal into an intermediate frequency signal by using an oscillation signal generated by the oscillation circuit, an ALC circuit to detect a level of the oscillation signal and control the level of the oscillation signal at a specified value, and a switching circuit switch the operation of the ALC circuit from the operational state to the non-operational state and vice versa. The receiver thus constructed will not receive an influence from the image signal, and even when the receiver is used in an area where a strong interference wave is present, the receiver is able to operate the local oscillation circuit in a normal condition.

3 Claims, 5 Drawing Sheets

ALC CIRCUIT RECEIVER WITH SENSITIVITY SWITCHING FOR CONTROLLING

BACKGROUND OF THE INVENTION

1. Field of the Invention

The present invention relates to a radio receiver.

2. Description of the Related Art

The conventional technique disclosed, for example, U.S. Pat. No. 5,020,147 "FM/AM broadcast signal converter" correspondent to the Japanese Patent Application Laid-open No. 1-273432) mentions that an FM broadcast receiver can be integrated into one chip to adopt the direct conversion system instead of the superheterodyne system.

FIG. 1 illustrates one example of such a receiver, in which the FM intermediate frequency is 150 kHz, the part surrounded by a chain line is integrated into one chip as an IC 10, and the components or circuits placed outside the chain line are connected to the IC 10 from outside, thus forming a receiver.

And, of the outside components or the outside circuits, the symbol 41 indicates an antenna, the symbol 42 a pre-selector (band pass filter) of which pass band is the FM band, the symbol 43 indicate a resonant circuit for a local oscillator, which is formed of a coil and variable capacitor, and the symbol 44 indicates a speaker.

Upon reception of an FM broadcast signal, the signal received by the antenna 41 is supplied to mixing circuits 12I and 12Q through the signal line of the pre-selector 42 and a radio frequency amplifier 11. Here, suppose that the objective received signal SRX is given by:

$$SRX = A \sin \omega RXt,$$

$$\omega RX = 2\pi fRX.$$

And, in the subsequent signal processing, only the relative amplitude and phase of the signals are involved; and in the description of the foregoing equation and the following, the initial phase of the signals will be omitted.

And, assuming that the local oscillation frequency is given by:

$$fLO = fRX - fIF$$

fIF: FM intermediate frequency (=150 kHz), a local oscillation circuit 21 generates a local oscillation signal SLO having double the frequency of the original local oscillation frequency fLO.

And, the signal SLO is supplied to frequency dividing circuits 22I, 22Q and the frequency is divided into half. As shown in FIG. 5, for example, the frequency dividing circuits 22I, 22Q generate signals SLI, SLQ, respectively, that reverse at a zero-crossing point in the rising phase and at a zero-crossing point in the falling phase. That is, the signal SLO is divided into the signals SLI, SLQ having the frequency fLO and the phase difference of 90° between the two, expressed as:

$$SLI = B\cos\omega LO$$

$$SLQ = B\sin\omega LO$$

$$\omega LO = 2\pi fLO.$$

Incidentally, in the description of the foregoing equation and the following, only the fundamental components (SLI and SLQ) will be expressed as to the SLI SLQ SLQ for simplification, and the harmonics of them will be omitted.

These signals SLI, SLQ are supplied to the mixing circuits 12I, 12Q, respectively, as the local oscillation signals.

Therefore, output signals SII, SIQ of the mixing circuits 12I, 12Q will be given by the following.

$$SII = SRX \cdot SLI$$
$$= A \sin\omega RXt \times B \cos\omega LO$$
$$= \alpha\{\sin(\omega RX + \omega LO)t + \sin(\omega RX - \omega LO)t\}$$

$$SIQ = SRX \cdot SLQ$$
$$= A \sin\omega RXt \times B \sin\omega LO$$
$$= \alpha\{-\cos(\omega RX + \omega LO)t + \cos(\omega RX - \omega LO)t\}$$

$$\alpha = A \cdot B/2$$

And, as described later, the signal components of the angular frequency ($\omega RX + \omega LO$) are removed from these signals SLI, SLQ, and the signal components of the angular frequency ($\omega RX - \omega LO$) are used as the intermediate frequency signal; and for simplicity, ignoring the signal components of the angular frequency ($\omega RX + \omega LO$) in the foregoing equation will produce the following.

$$SII = \alpha\sin(\omega RX - \omega LO)t$$

$$SIQ = \alpha\cos(\omega RX - \omega LO)t$$

And, here the image signal Sim is given by $$Sim = C \sin\omega imt$$

$$\omega im = \omega LO + \omega IF$$

$$\omega IF = 2\pi fIF,$$

and if the received signal SRX from the pre-selector 42 contains the image signal Sim, the signals SII, SIQ in this case are expressed by the following equations.

$$SII = \alpha\sin(\omega RX - \omega LO)t + \beta\sin(\omega im - \omega LO)t$$

$$SIQ = \alpha\cos(\omega RX - \omega LO)t + \beta\cos(\omega im - \omega LO)t$$

$$b = A \cdot C/2$$

Further, the following relation is given in this case:

$$\omega RX < \omega LO < \omega im,$$

and therefore, the foregoing equations are expressed as follows.

$$SII = \alpha\sin(\omega RX - \omega LO)t + \beta\sin(\omega im - \omega LO)$$
$$= -\alpha\sin(\omega LO - \omega RX)t + \beta\sin(\omega im - \omega LO)$$

$$SIQ = \alpha\cos(\omega RX - \omega LO)t + \beta\cos(\omega im - \omega LO)t$$
$$= \alpha\cos(\omega LO - \omega RX)t + \beta\cos(\omega im - \omega LO)t$$

And, these signals SII, SIQ are supplied to phase shifting circuits 13I, 13Q. The phase shifting circuits 13I, 13Q are configured with, for example, active filters using capacitors, resistors, and operational amplifiers. The phase shifting circuit 13I shifts the phase of the signal SII φ by and the phase shifting circuit 13Q shifts the phase of the signal SIQ by (φ+90°). Thereby, the phase shifting circuits 13I, 13Q maintain the phase difference between the two inputted signals SII, SIQ within 90°±1° in a required intermediate frequency band.

Thus, the signal SIQ advances in phase by 90° compared to the signal SII due to phase shifting circuits 13I, 13Q. The signals SII, SIQ are transformed into:

$$SII = -\alpha\sin(\omega LO - \omega RX)t + b\sin(\omega im - \omega LO)t$$

$$SIQ = \alpha\cos\{(\omega LO - \omega RX)t + 90°\} + \beta\cos\{(\omega im - \omega LO)t + 90°\}$$

$$= -\alpha\sin(\omega LO - \omega RX)t - \beta\sin(\omega im - \omega LO)t.$$

And, these signals SII, SIQ are supplied to an adding circuit 14, which produces an added signal:

$$SIF = SII + SIQ$$

$$= -\alpha\sin(\omega LO - \omega RX)t + \beta\sin(\omega im - \omega LO)t -$$

$$\alpha\sin(\omega LO - \omega RX)t - \beta\sin(\omega im - \omega LO)t$$

$$= -2\alpha\sin(\omega LO - \omega RX)t.$$

Here, in the foregoing equation, since $$\omega LO - \omega RX = 2\pi(fLO - fRX) = 2\pi fIF$$

is given, the signal SIF is the objective intermediate frequency signal of the received signal SRX. And, even if the received signal SRX from the pre-selector 42 contains the image signal Sim, this intermediate frequency signal SIF does not contain the signal components generated by the image signal Sim because they are canceled.

Thus, the adding circuit 14 produces the intermediate frequency signal SIF [and the signal components of the angular frequency ($\omega RX + \omega LO$)] which are converted from the received signal SRX.

And, this intermediate frequency signal SIF is supplied to a band pass filter 15 for filtering the FM intermediate frequency components. This band pass filter 15 is configured with, for example, an active filter in the same manner as the phase shifting circuits 13I, 13Q, and the center frequency of the pass band is specified as 150 kHz. Thus, the band pass filter 15 removes undesired signal components such as the signal components of the angular frequency ($\omega RX + \omega LO$), and extracts only the intermediate frequency signal SIF.

And, this extracted signal SIF is supplied through a limiter 16 to an FM demodulating circuit 17 of the pulse count type to extract an audio signal. This audio signal is supplied through an audio frequency amplifier 18 to a speaker 44.

Thus, according to FIG. 1, since the FM intermediate frequency is set as low as 150 kHz, the intermediate frequency filter 15 can be integrated into a chip by configuring it with one of the active type. Accordingly, the part 10 surrounded by the chain line can be made into one chip IC.

Lowering the intermediate frequency as above will deteriorate the image characteristic; however, if the received signal SRX from the pre-selector 42 contains the image signal Sim, the signal components of the image signal can be canceled at the adding circuit 14 as mentioned above. Therefore, it is possible to listen to a broadcast without interference caused by the image signal Sim, that is, to improve the image characteristic.

Further, in the foregoing case, the IC 10 is applied to an FM receiver that employs a coil and a variable capacitor for the resonant circuit 43 connected to the IC 10. However, the IC 10 can be applied to an FM receiver of a synthesizer system that tunes stations.

FIG. 2 illustrates one example in which the IC 10 shown in FIG. 1 is applied to an FM receiver of the synthesizer system. In this case, the resonant circuit 43 for the local oscillation is configured with a local oscillation coil L43 and a variable capacity diode D43.

And, this resonant circuit 43 functions as a part of a PLL 430. That is, the local oscillation signal SLO obtained at the resonant circuit 43 is supplied through a buffer amplifier 431 to a variable frequency dividing circuit 432, where the frequency of the local oscillation signal SLO is divided into 1/N to be outputted as a signal S32. And, this frequency divided signal S32 is supplied to a phase comparator 433. On the other hand, an oscillation circuit 434 generates a signal of a reference frequency, for example 100 kHz, and this signal is also supplied to the phase comparator 433. The comparison output from this phase comparator 433 is supplied through a low-pass filter 435 and a buffer resistor R43 to the variable capacity diode D43 as a voltage to control the variable capacity diode D43.

Therefore, in the steady state, the frequency of the frequency divided signal S32 is equal to the oscillation frequency (=100 kHz) of the oscillation circuit 434, and the oscillation frequency 2fLO of the local oscillation signal SLO in this case is given by the following.

$$2fLO = N \times 100[kHz]$$

And, here, $$fRX = fLO + fIF$$

$$fIF = 150\ kHz$$

are given. Therefore, from these equations, $$fRX = N \times 50 + 150[kHz]$$

is obtained.

Therefore, to vary the frequency dividing ratio N of the variable frequency dividing circuit 432 by units of 2 within the range of 1517 to 1797 will vary the frequency fLO of the signals SLI, SLQ by steps of 100 kHz within the range of 75.85 MHz to 89.85 MHz, and the received signal frequency fRX can be varied by steps of 100 kHz within the range of 76 MHz to 90 MHz. Further, the frequency dividing ratio N can be set or varied by a microcomputer, in the same manner as a general PLL synthesizer receiver.

Thus, the IC 10 can be used also for an FM receiver of the PLL synthesizer system.

Incidentally, in the foregoing IC 10, if the waveform of the oscillation signal SLO generated by the local oscillation circuit 21 is distorted as shown by a dotted line in FIG. 5, the length τ+ of the positive half cycle does not coincide with the length τ− of the negative half cycle, that is, the duty ratio of the signal SLO deviates from 50%.

And, since the signals SLI, SLQ are designed to be inverted at the zero crossing points of the signal SLO, if the duty ratio of the signal SLO deviates 50%, the phase difference between the signal SLI and the signal SLQ deviates 90° as shown by the dotted line in FIG. 5.

Accordingly, the phase difference between the image signal Sim contained in the signal SII and the image signal Sim contained in the signal SIQ, which are supplied to the adding circuit 14, deviates 180°. As a consequence, the image signal Sim contained in the signal SII and the image signal Sim contained in the signal SIQ will not be canceled sufficiently in the adding circuit 14, and the intermediate frequency signal SIF outputted from the adding circuit 14 will contain the residual components of the image signal Sim.

According to the experiments and theoretical calculations, if the deviation of the phase difference between the signal SLI and SLQ is within ±1° from 90° (namely, the phase difference is within 89° to 91°), the image suppression ratio of 40 dB can be obtained. However, if the deviation of the phase difference becomes 2°, the image suppression ratio will go down to 34 dB.

Accordingly, it is considered to provide an automatic level control (ALC) circuit, to detect the level of the oscillation signal SLO generated by the local oscillation circuit 21, and to control the signal level at a specified value by the detected signal. That is, satisfying such an arrangement will reduce the distorted components (harmonics) contained in the oscillation signal SLO, and the waveform of the signal SLO becomes a pure sine wave to bring the duty ratio into 50%. Accordingly, the phase difference between the signal SLI and the signal SLQ becomes 90°, which gives the initially intended image characteristic.

However, if a receiver with an ALC circuit simply provided is used in an area where a strong interference radio wave such as a TV broadcasting wave near the TV transmission antenna is present, the strong interference signal will penetrate from the antenna 41 through the mixing circuits 12I, 12Q into the local oscillation circuit 21. And, when detecting a level of the oscillation signal SLO, the ALC circuit detects a level containing the interference wave signal. Consequently, the oscillation strength of the oscillation circuit 21 becomes lower than a desired value, and this will shut down the oscillation in the worst case, which is well conceivable.

SUMMARY OF THE INVENTION

The present invention intends to solve the foregoing problems.

In order to achieve the foregoing object, a receiver according to the invention contains a local oscillation circuit, a mixing circuit to perform a frequency conversion from a received signal into an intermediate frequency signal by using an oscillation signal generated by the oscillation circuit, an ALC circuit to detect a level of the oscillation signal and control the level of the oscillation signal at a specified constant value, and a control circuit to switch the operation of the ALC circuit from an operational state and a non-operational state and vice versa.

Therefore, in an area where the level of an interference wave is very high, the control circuit controls to switch the operation of the ALC circuit into the non-operational state, and thereby brings the oscillation circuit into a normal operation that generates the oscillation signal.

DESCRIPTION OF THE PREFERRED EMBODIMENT

Preferred embodiments of the present invention will hereafter be described in detail with reference to the accompanying drawings.

Figure 2:
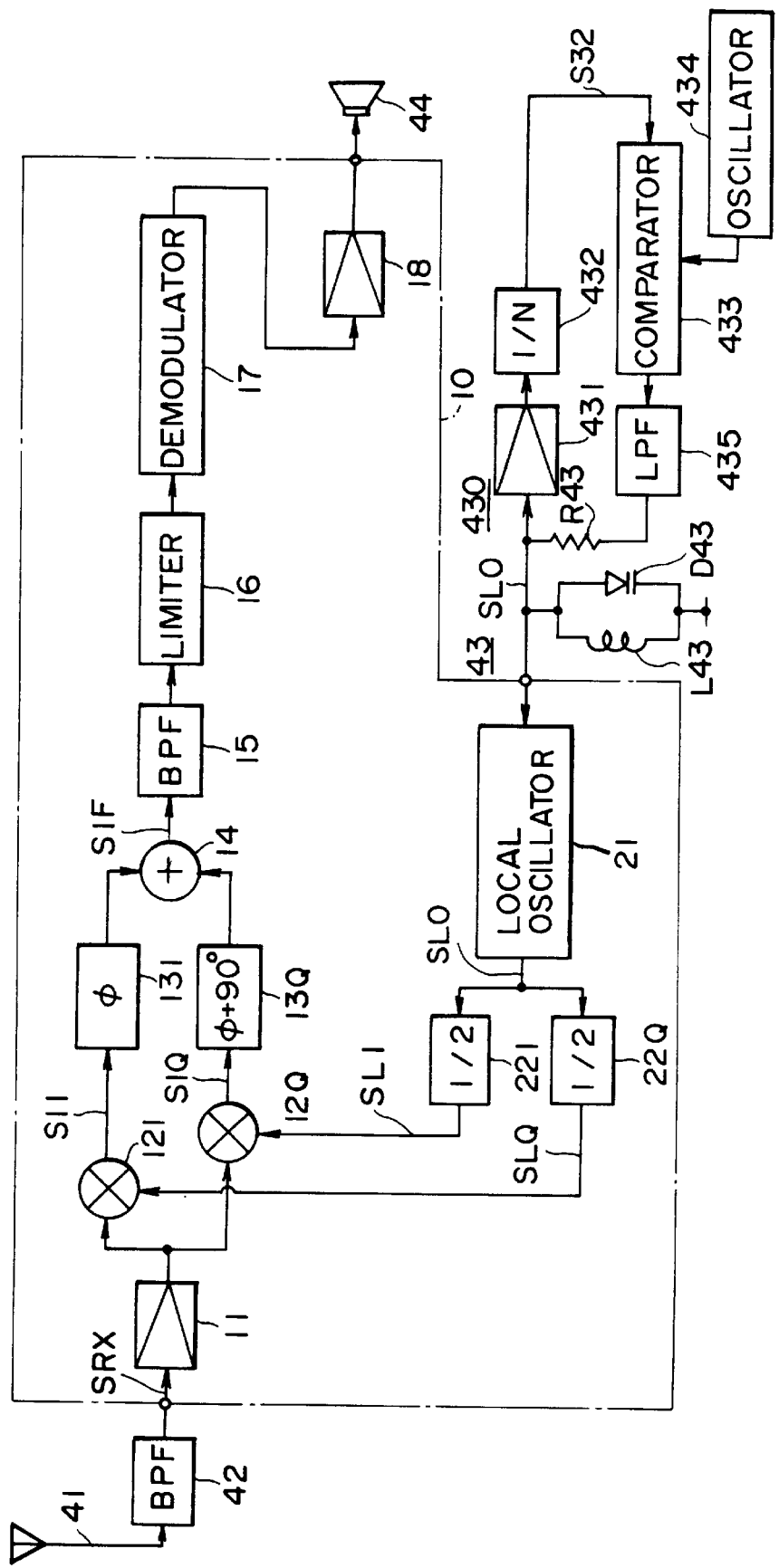
FIG. 2 is a connection diagram to illustrate another prior embodiment.
Figure 3:
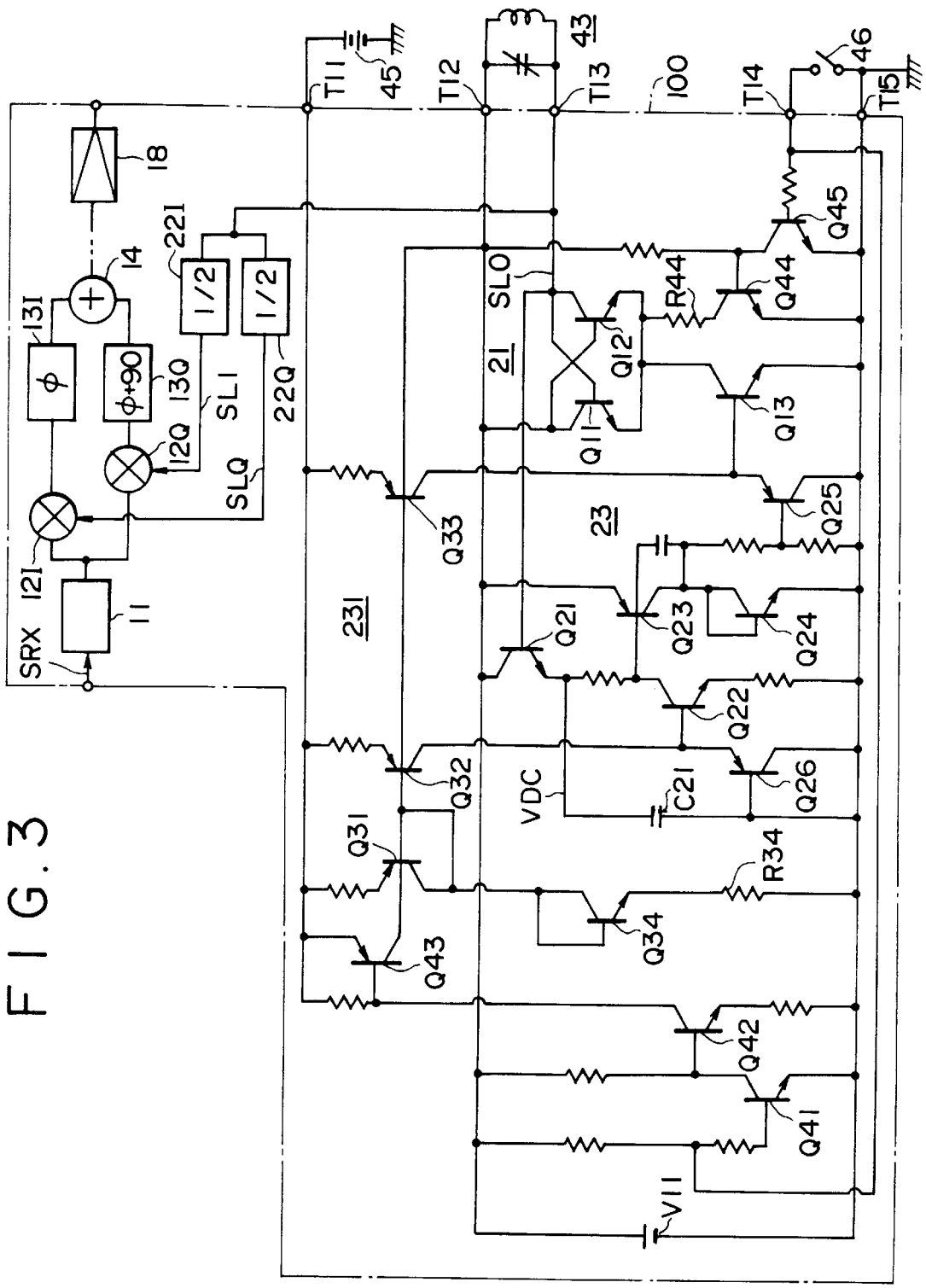
FIG. 3 is a connection diagram to illustrate one embodiment relating to the present invention.

FIG. 3 illustrates one embodiment relating to the present invention. In FIG. 3, an IC 100 is configured in the same manner as the IC 10 described in FIG. 1 and FIG. 2 as a whole. However, the local oscillation circuit 21 and the ALC circuit 23 are configured, for example, as follows.

That is, in the IC 100, the symbols T11 to T15 indicate a part of terminals (external connection pins) of the IC 100, the terminal T11 is a power supply terminal, and the terminal T15 is a ground terminal. And, between the power supply terminal T11 and the ground terminal T15 is connected a battery 45 to supply a dc voltage, for example, 3 volts.

And, the local oscillation circuit 21 is configured with transistors Q11 to Q13. Here, the emitters of the transistors Q11, Q12 are connected to the collector of the transistor Q13 for a constant current source; and the base of the transistor Q11 is connected to the collector of the transistor Q12 and the base of the transistor Q12 is connected to the collector of the transistor Q11. Further, the collector of the transistor Q12 is connected to the terminal T13, a constant voltage source V11 of, for example, 1.25 volts is connected to the terminal T12, and between the terminal T12 and the terminal T13 is connected a tuning circuit 43.

Therefore, the collector of the transistor Q12 generates the local oscillation signal SLO, and the generated signal level becomes a level corresponding to the magnitude of the emitter currents of the transistors Q11, Q12. And, this local oscillation signal SLO is supplied to the frequency dividing circuits 22I, 22Q.

Further, the ALC circuit 23 is configured with transistors Q21 to Q33. That is, the base of the transistor Q21 is connected to the collector of the transistor Q12, and the transistor Q22 and a capacitor C21 are connected between for a constant current source between the emitter of the transistor Q21 and the ground terminal T15.

Thus, the transistor Q21 is put into the B class biasing operation. The transistor Q21 rectifies or detects the oscillation signal SLO, and the capacitor C21 smoothes the rectified output, thereby producing a dc voltage VDC having a level corresponding to the signal level of the oscillation signal SLO. That means that the level of the oscillation signal SLO is detected.

The dc voltage VDC is supplied to the base of the transistor Q24 through the transistors Q23, Q24, the emitter of the transistor Q25 is connected to the base of the transistor Q13, and the collector of the transistor Q25 is connected to the ground terminal T15.

Further, a current mirror circuit 231 using the terminal T11 as a reference potential is configured with transistors Q31 to Q33. The transistor Q31 on the input side is supplied with a constant dc current by the transistor Q34 in the diode connection and a resistor R34, and the collectors of the transistors Q32, Q33 each produce a constant current output.

And, the collector current from the transistor Q32 is supplied to the transistor Q26 and the voltage drop by the transistor Q26 is supplied to the base of the transistor Q22 as the base bias voltage, whereby the transistor Q22 is made to function as a constant current source. And, the collector of the transistor Q33 is connected to the emitter of the transistor Q25.

Further, between the terminal T14 and the terminal T15 is connected a switch 46 to control the operational state and the non-operational state of the ALC circuit 23. The terminal T14 is connected to the base of the transistor Q43 through the transistors Q41, Q42, and the collector/emitter of this transistor Q43 is connected between the base of the transistor Q31 and the terminal T11.

Further, between the emitters of the transistors Q11, Q12 and the terminal T15 is connected a series circuit of a resistor R44 and a collector/emitter of a transistor Q44. The base of the transistor Q44 is supplied with a base bias voltage from the voltage source V11, the collector/emitter of a transistor Q45 is connected between the base of the transistor Q44 and the terminal T15, and the base of the transistor Q45 is connected to the terminal T14.

Figure 1:
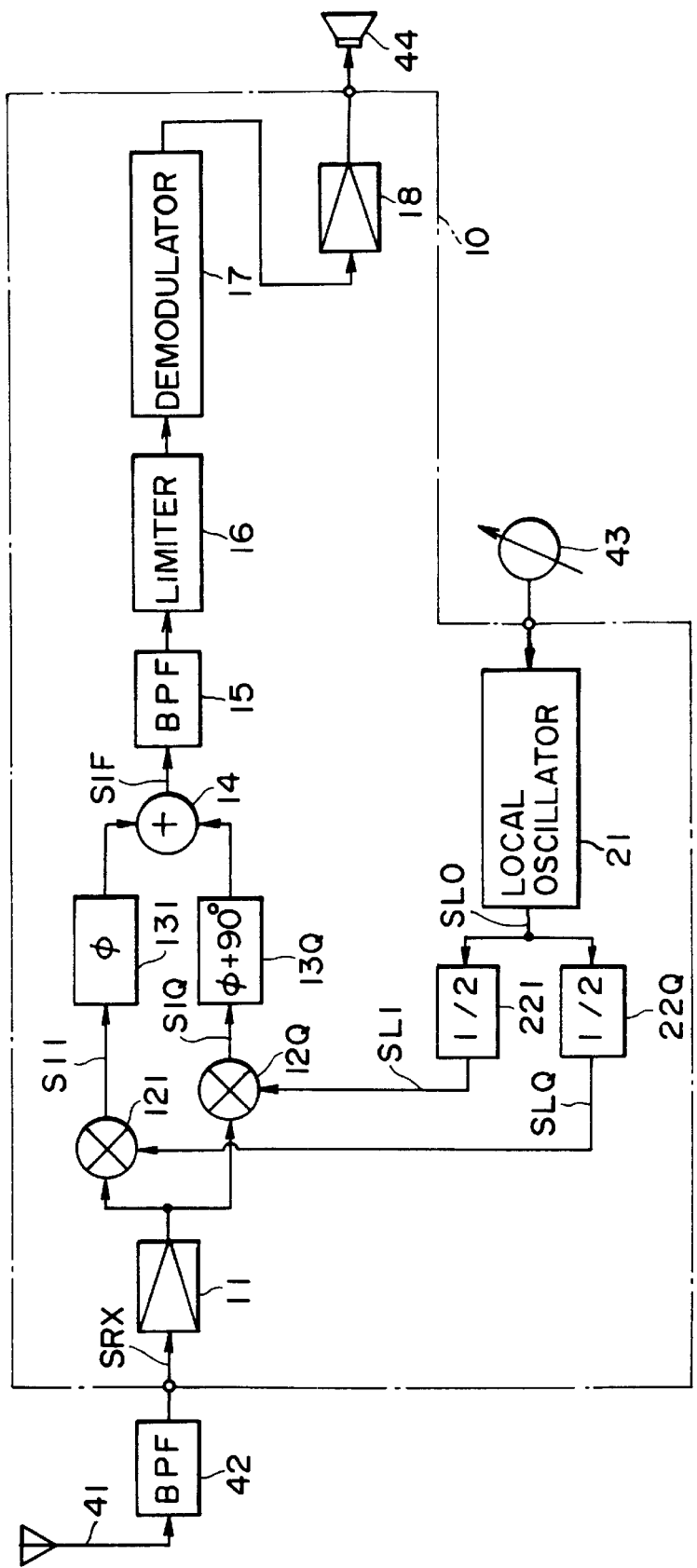
FIG. 1 is a connection diagram to illustrate one prior embodiment.

The other parts of the IC 100 relating to the invention shown in FIG. 3 are configured in the same manner as the IC 10 shown in FIG. 1. That is, there are provided the frequency dividing circuits 22I, 22Q that divide the frequency of the local oscillation signal SLO into half, the radio frequency amplifier 11, the mixing circuits 12I, 12Q, the phase shifting circuits 13I, 13Q, the adding circuit 14, the band pass filter 15, the limiter 16, and the demodulator power amplifier 18. These circuits perform the same operations as those of the IC 10 in FIG. 1. And, the power amplifier 18 is connected to the speaker through the terminal, and the speaker emits sounds.

Figure 4:
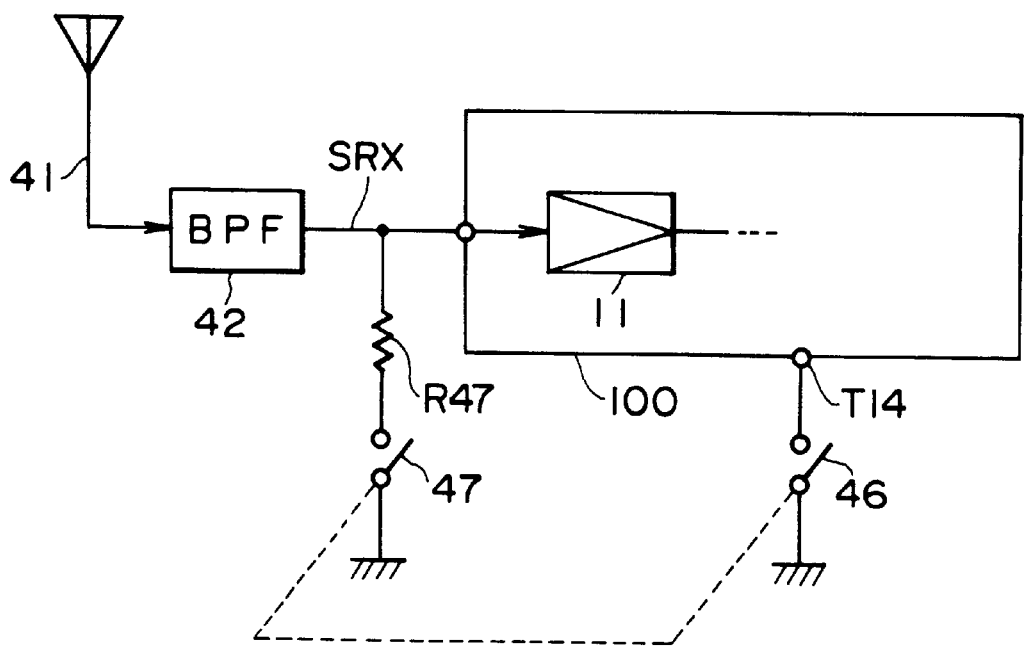
FIG. 4 is a connection diagram to illustrate one embodiment relating to the present invention.
Figure 5:
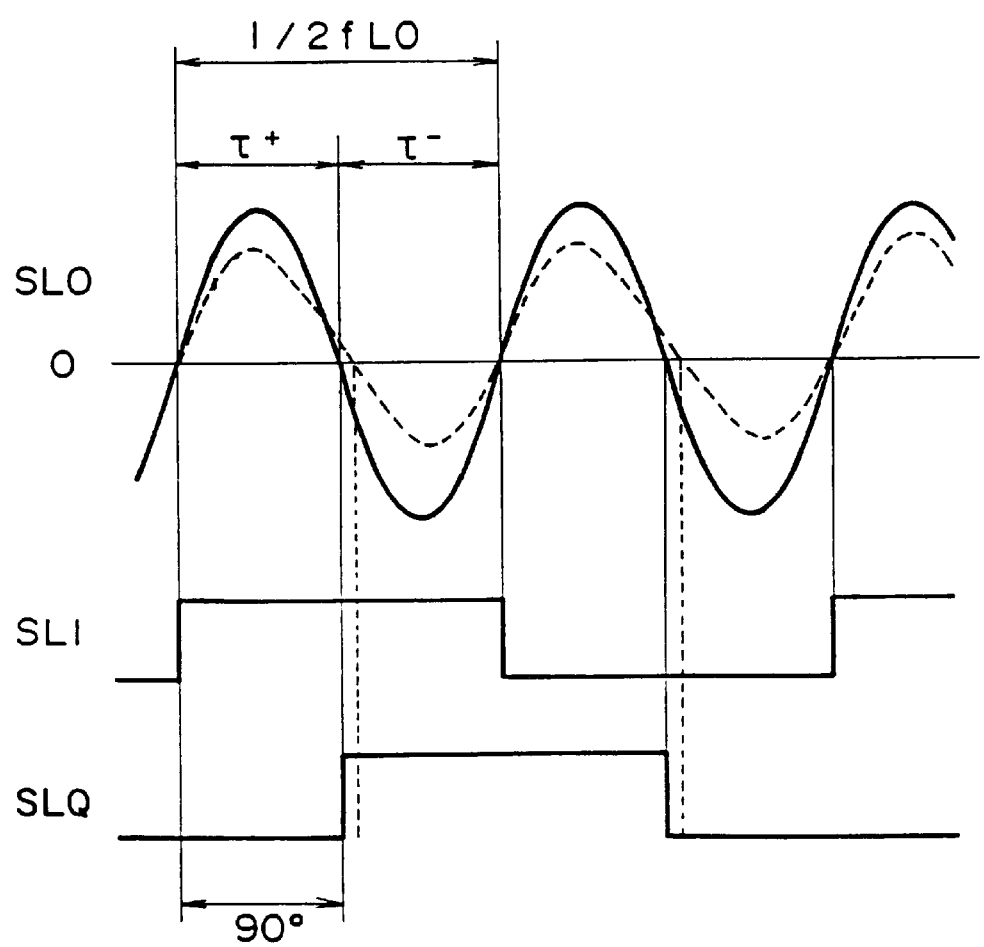
FIG. 5 is a waveform chart to explain the present invention.

Further, according to this embodiment, the received signal SRX received by the antenna 41 is transmitted to the pre-selector 42, and the output of the pre-selector 42 is supplied to a terminal connected to the radio frequency amplifier 11 through a signal line provided for the received signal SRX; and here, as shown in FIG. 4, a series circuit of a resistor R47 for attenuation and a switch 47 for switching the sensitivity is connected to the signal line for the received signal SRX provided on the subsequent stage of the pre-selector 42, and the switch 46 is designed to interlock with the switch 47.

In this construction, if the switch 46 is set at the off position, the transistor Q41 is biased by the voltage of the voltage source V11 to be turned on, and thereby the transistor Q42 is turned off and the transistor Q43 is also turned off. Therefore, the current mirror circuit 231 operates effectively, and the transistors Q32, Q33 each outputs a specified collector current.

And, since the switch 46 is set at the off position, the transistor Q45 is also biased by the voltage of the voltage source V11 to be turned on, and thereby the transistor Q44 is turned off. Therefore, the sum of the emitter currents of the transistors Q11, Q12 becomes equal to the collector current of the transistor Q13.

And, when the level of the oscillation signal SLO increases, the level of the signal SLO supplied to the transistor Q21 also increases, and the level of the rectified voltage VDC increases. Then, the transistor Q23 turns the operation toward off and the transistor Q24 turns the operation toward off as well; and therefore, the base potential (to the ground) of the transistor Q25 is lowered to increase the collector current thereof.

And, if the collector current of the transistor Q25 increases, since the collector current of the transistor Q33 is constant, the base current of the transistor Q13 decreases and the collector current thereof also decreases. Therefore, the emitter currents of the transistors Q11, Q12 decrease, which lowers the level of the oscillation signal SLO produced by the transistors Q11, Q12.

And, when the level of the oscillation signal SLO decreases, on the contrary to the foregoing, since the level of the rectified voltage VDC decreases, the transistors Q23, Q24 change the operation toward on and the collector current of the transistor Q25 decreases. Therefore, the collector current of the transistor Q13 increases and the emitter currents of the transistors Q11, Q12 increase, and therefore, the level of the oscillation signal SLO increases.

In this manner, in case the switch 46 is set at the off position, the ALC circuit 23 becomes effective, the level of the oscillation signal SLO is maintained at a specified value. Therefore, the distortion of the oscillation signal SLO decreases to bring the duty ratio into 50%; and accordingly, the phase difference between the frequency dividing signal SLI and SLQ becomes 90°, and the image characteristic is improved.

On the other hand, if the switch 46 is set at the on position, the transistor Q41 is turned off, and thereby the transistor Q42 is turned on and the transistor Q43 is also turned on. Therefore, the transistors Q31 to Q33 are turned off, the transistor Q13 is turned off, and the ALC circuit 23 is brought into the non-operational state.

And, since the switch 46 is set at the on position, the transistor Q45 is turned off and the transistor Q44 is turned on. Therefore, the emitter currents of the transistors Q11, Q12 become a constant value that is determined by the resistor R44, and the oscillation circuit 21 generates the oscillation signal SLO having a constant level that is determined by the resistor R44.

Therefore, when the receiver is used in an area where a strong interference wave is present, even if the strong interference wave penetrates from the antenna 41 through the mixing circuits 12I, 12Q into the local oscillation circuit 21, provided that the switch 46 is set at the on position, the malfunction of the ALC circuit 23 is avoided and the oscillation circuit 21 will not stop the oscillation to continue to generate the oscillation signal SLO; and the broadcast can be received in a normal condition.

Thus, according to this IC100, the ALC circuit 23 controls the level of the local oscillation signal SLO at a constant value; and thereby, the image characteristic can be improved, even in an area having a strong interference wave, setting the switch 46 at the on position brings the local oscillation circuit 21 into a normal operation and the broadcast can be received in a normal condition.

And, if the switch 46 is set at the on position, the phase difference between the signal SLI and SLQ deviates from 90°, which will lead to lowering the image characteristic. However, in this embodiment, to set the switch 46 at the on position sets the switch 47 at the on position at the same time, which attenuates the level of the image signal Sim as well as the received signal SRX; and therefore, the lowering of the image characteristic will not cause much problem.

Further, in the foregoing embodiment, it is possible to detect the level of the received signal SRX supplied to the mixing circuits 12I, 12Q or the level of the intermediate frequency signals SII, SIQ outputted from the mixing circuits 12I, 12Q, by using the detected output, to control the operation of the ALC circuit 23 from the operational state to the non-operational state and vice versa, in the same manner as the on/off operation by the switch 46.

According to the invention, the image characteristic can be improved, and even in an area where a strong interference wave is present, the local oscillation circuit can be set in a normal operation, and the broadcast can be received in a normal condition.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A receiver comprising:

a pre-selector to extract FM band components from a signal received by an antenna, a local oscillation circuit, a mixing circuit to perform a frequency conversion from an output signal of said pre-selector into an intermediate frequency signal by using an oscillation signal generated by said local oscillation circuit, an automatic level control (ALC) circuit to detect a level of said oscillation signal and being operable to control said level of said oscillation signal at a specified constant value so as to reduce a distorted component contained in said oscillation signal, switch means connected to said ALC circuit for switching said ALC circuit to be operational or nonoperational, and a sensitivity switching circuit for controlling a reception sensitivity of the receiver and being connected to the output signal of said pre-selector and including a series circuit of an attenuation resistor and a switch connected between the output signal of said pre-selector and ground potential, wherein said switch is interlocked with said switch means, so that in a mode of reduced sensitivity said switch mans controls said ALC circuit to be nonoperational and in a mode of increased sensitivity said switch means controls said ALC circuit to be operational.

2. The receiver as claimed in claim 1, further comprising a frequency dividing circuit for dividing the frequency of said oscillation signal, wherein an output of said frequency dividing circuit is supplied to said mixing circuit to perform said frequency conversion.

3. A receiver comprising: a pre-selector to extract FM band components from a signal received by an antenna;

a local oscillation circuit;

a mixing circuit to perform a frequency conversion from an output signal of said pre-selector into an intermediate frequency signal by using an oscillation signal generated by said oscillation circuit;

an automatic level control (ALC) circuit to detect a level of said oscillation signal and to control said level of said oscillation signal at a specified constant value;

switch means connected to said ALC circuit for controlling said ALC circuit to be in an operational state or a nonoperational state; and a sensitivity switching circuit for switching a reception sensitivity of the receiver and being connected to an output of said pre-selector and including a series circuit of an attenuation resistor and a switch connected between said output of said pre-selector and g round potential, wherein said switch is interlocked with said switch means, so that in a mode of reduced sensitivity said switch means controls said ALC to be nonoperational and in a mode of increased sensitivity said switch means controls said ALC to be operational.

* * * * *